(12) United States Patent
Hori

(10) Patent No.: US 12,488,494 B2
(45) Date of Patent: Dec. 2, 2025

(54) INFORMATION PROCESSING APPARATUS, INFORMATION PROCESSING SYSTEM, INFORMATION PROCESSING METHOD, AND NON-TRANSITORY COMPUTER READABLE MEDIUM

(71) Applicant: TOYOTA JIDOSHA KABUSHIKI KAISHA, Toyota (JP)

(72) Inventor: Tatsuro Hori, Edogawa-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 315 days.

(21) Appl. No.: 18/355,980

(22) Filed: Jul. 20, 2023

(65) Prior Publication Data

US 2024/0037777 A1 Feb. 1, 2024

(30) Foreign Application Priority Data

Aug. 1, 2022 (JP) .................................. 2022-122963

(51) Int. Cl.
*G06K 9/00* (2022.01)
*G06F 3/14* (2006.01)
(Continued)

(52) U.S. Cl.
CPC .................. *G06T 7/70* (2017.01); *G06F 3/14* (2013.01); *G06T 7/20* (2013.01); *G06V 10/761* (2022.01);
(Continued)

(58) Field of Classification Search
CPC ........ G06V 20/52; G06V 20/44; G06V 20/41; G06V 2201/07; G06V 10/62; G06V 10/764; G06V 10/82; G06V 40/103; G06V 20/40; G06V 40/20; G06V 40/23; G06V 10/44; G06V 40/10; G06V 10/245; G06V 20/46; G06V 40/171; G06V 10/147; G06V 40/167; G06V 40/161; G06V 20/64; G06V 20/653; G06V 40/165; G06V 40/172; G06V 40/176; G06V 10/25; G06V 10/7553;
(Continued)

(56) References Cited

U.S. PATENT DOCUMENTS

2003/0191779 A1 10/2003 Sagawa et al.
2006/0120564 A1* 6/2006 Imagawa ............... G06V 40/20
382/103
(Continued)

FOREIGN PATENT DOCUMENTS

CN 113158914 A 7/2021
JP 2003-280506 A 10/2003
(Continued)

*Primary Examiner* — Alex Kok S Liew
(74) *Attorney, Agent, or Firm* — Oliff PLC

(57) ABSTRACT

An information processing apparatus includes an interface configured to acquire an image of a first user, information regarding posture or motion of the first user, and information regarding posture or motion of a second user, and a controller configured to generate difference information regarding a difference between the posture or motion of the first user and the posture or motion of the second user. The controller is configured to notify the second user of the difference information while controlling a display device to display the image of the first user or an image of the second user.

16 Claims, 7 Drawing Sheets

(51) Int. Cl.
  *G06T 7/20* (2017.01)
  *G06T 7/70* (2017.01)
  *G06V 10/74* (2022.01)
  *G06V 10/764* (2022.01)

(52) U.S. Cl.
  CPC .. *G06V 10/764* (2022.01); *G06T 2207/20044* (2013.01)

(58) Field of Classification Search
  CPC .... G06V 40/107; G06V 40/28; G06V 40/173; G06V 10/255; G06V 10/457; G06V 10/225; G06V 20/49; G06V 20/20; G06V 10/40; G06V 30/19173
  See application file for complete search history.

(56) References Cited

U.S. PATENT DOCUMENTS

| | | | |
|---|---|---|---|
| 2018/0239961 A1* | 8/2018 | Ekambaram | G06V 40/20 |
| 2020/0193148 A1* | 6/2020 | He | G06F 3/0304 |
| 2022/0023717 A1 | 1/2022 | Kaku et al. | |

FOREIGN PATENT DOCUMENTS

| | | |
|---|---|---|
| JP | 2003-295754 A | 10/2003 |
| JP | 2010-069102 A | 4/2010 |
| JP | 2021-110782 A | 8/2021 |
| JP | 2022-023483 A | 2/2022 |
| JP | 2022-039120 A | 3/2022 |

\* cited by examiner

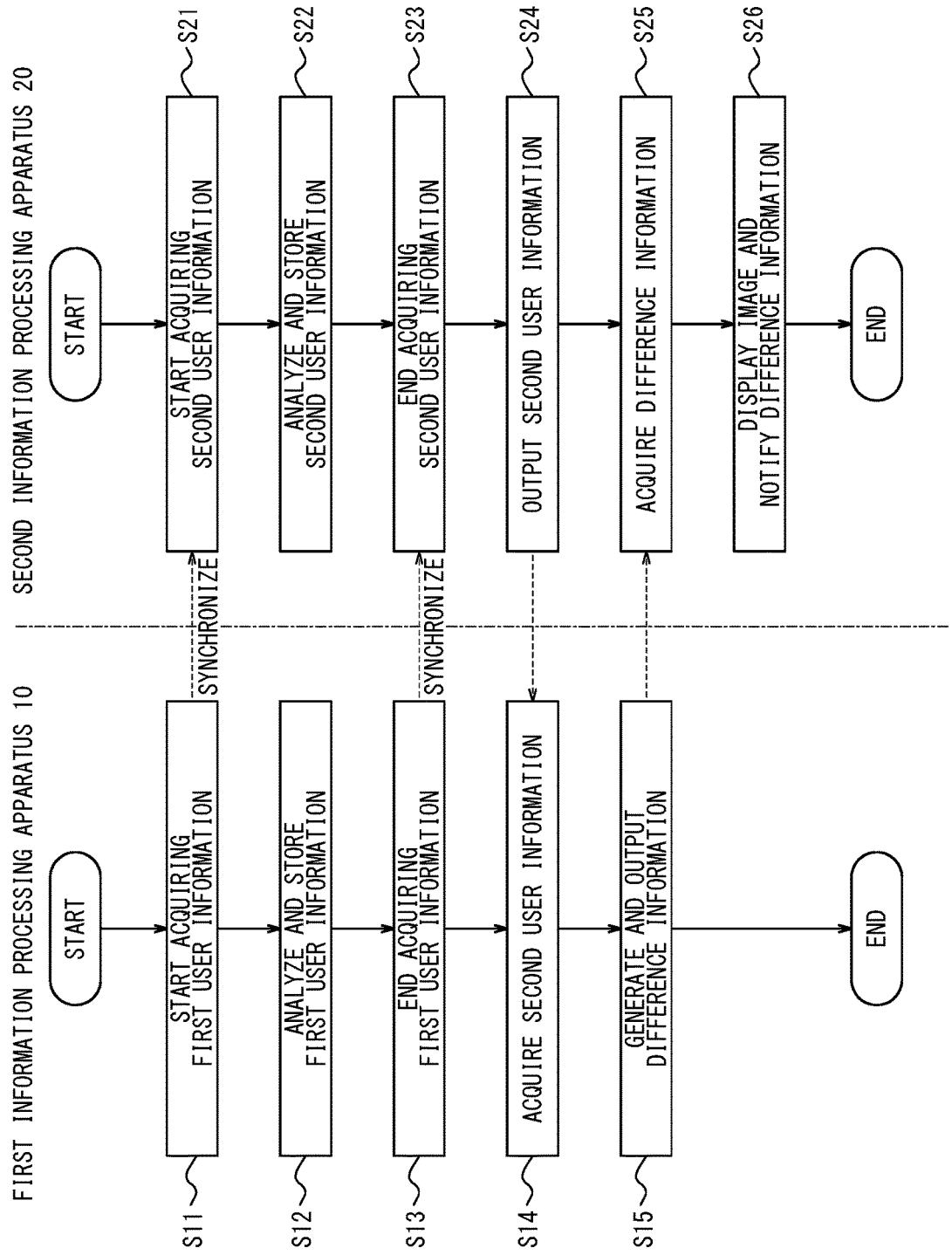

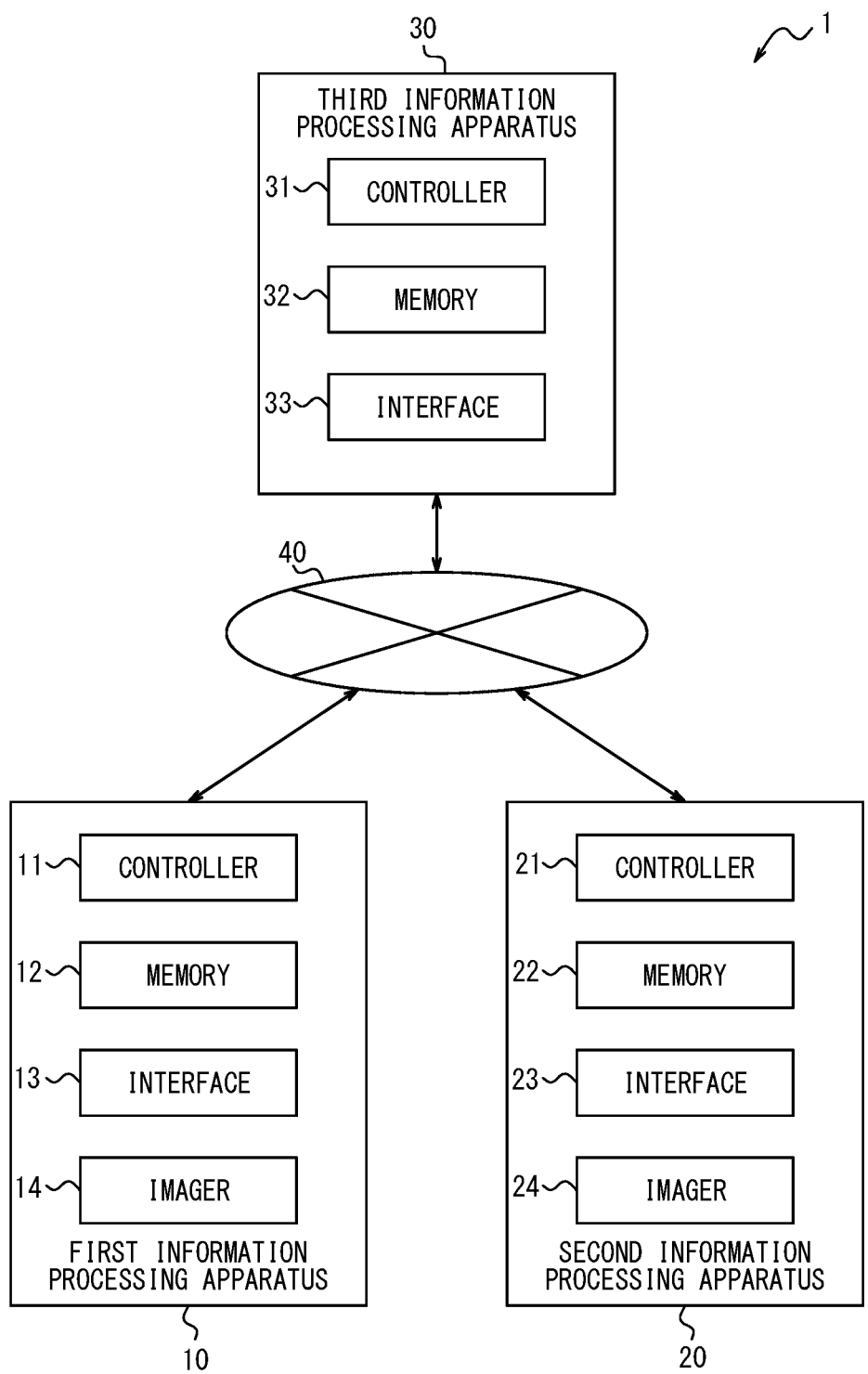

INFORMATION PROCESSING APPARATUS, INFORMATION PROCESSING SYSTEM, INFORMATION PROCESSING METHOD, AND NON-TRANSITORY COMPUTER READABLE MEDIUM

CROSS-REFERENCE TO RELATED APPLICATION

This application claims priority to Japanese Patent Application No. 2022-122963, filed on Aug. 1, 2022, the entire contents of which are incorporated herein by reference.

TECHNICAL FIELD

The present disclosure relates to an information processing apparatus, an information processing system, an information processing method, and a non-transitory computer readable medium.

BACKGROUND

Systems for education in which an image of an instructor and images of students are displayed are known (refer to, for example, Patent Literature (PTL) 1).

CITATION LIST

Patent Literature

PTL 1: JP 2021-110782 A

SUMMARY

When practicing with an instructor's image as a model, each student can efficiently practice by recognizing a difference between the instructor's posture or motion and the student's own posture or motion. There is a need to improve practice efficiency.

It would be helpful to improve practice efficiency of students.

An information processing apparatus according to an embodiment of the present disclosure includes an interface and a controller. The interface is configured to acquire an image of a first user, information regarding posture or motion of the first user, and information regarding posture or motion of a second user. The controller is configured to generate difference information regarding a difference between the posture or motion of the first user and the posture or motion of the second user. The controller is configured to notify the second user of the difference information while controlling a display device to display the image of the first user or an image of the second user.

An information processing system according to an embodiment of the present disclosure includes the information processing apparatus, as each of a first information processing apparatus and a second information processing apparatus. The first information processing apparatus includes a first interface and a first controller. The first interface is configured to acquire information regarding posture or motion of a first user, and information regarding posture or motion of a second user. The first controller is configured to generate difference information regarding a difference between the posture or motion of the first user and the posture or motion of the second user, and output the difference information to the second information processing apparatus. The second information processing apparatus includes a second interface configured to acquire an image of the first user and the difference information, and notify the second user of the difference information while displaying the image of the first user.

An information processing method according to an embodiment of the present disclosure includes:
acquiring an image of a first user, information regarding posture or motion of the first user, and information regarding posture or motion of a second user;
generating difference information regarding a difference between the posture or motion of the first user and the posture or motion of the second user;
controlling a display device to display the image of the first user or an image of the second user; and
notifying the second user of the difference information.

A non-transitory computer readable medium according to an embodiment of the present disclosure stores an information processing program. The information processing program is configured to cause an information processing apparatus to execute operations, the operations including:
acquiring an image of a first user, information regarding posture or motion of the first user, and information regarding posture or motion of a second user;
generating difference information regarding a difference between the posture or motion of the first user and the posture or motion of the second user;
controlling a display device to display the image of the first user or an image of the second user; and
notifying the second user of the difference information.

According to the information processing apparatus, information processing system, information processing method, and non-transitory computer readable medium of the embodiments of the present disclosure, practice efficiency of students can be improved.

BRIEF DESCRIPTION OF THE DRAWINGS

In the accompanying drawings:

FIG. 4 is a flowchart illustrating an example procedure for an information processing method according to the embodiment;

FIG. 6 is a block diagram illustrating an example configuration of the information processing system that further includes a third information processing apparatus.

DETAILED DESCRIPTION (Example Configuration of Information Processing System 1)

Figure 1:
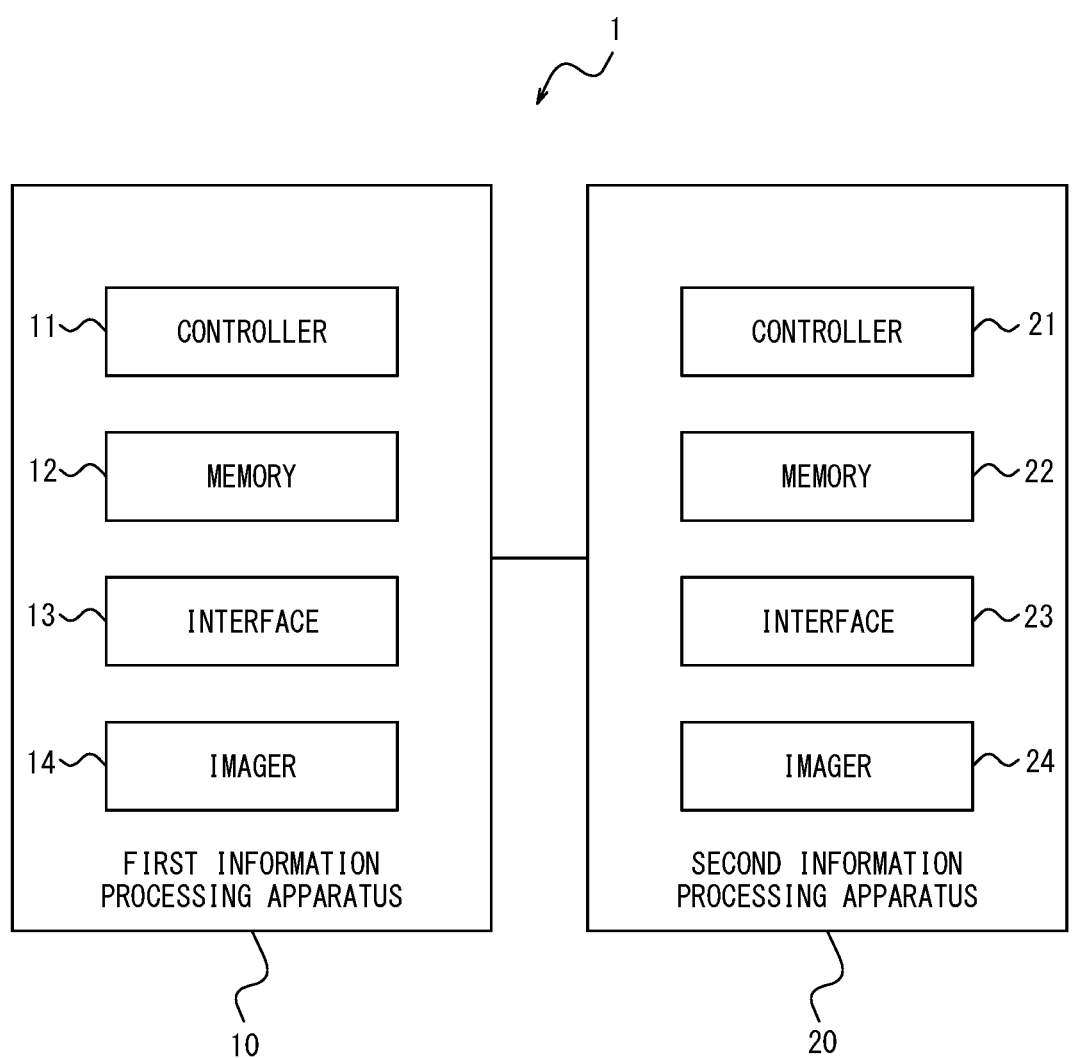
FIG. 1 is a block diagram illustrating an example configuration of an information processing system according to an embodiment.

As illustrated in FIG. 1, an information processing system 1 according to an embodiment includes a first information processing apparatus 10 and a second information processing apparatus 20. The first information processing apparatus 10 or the second information processing apparatus 20 is also referred to simply as an information processing apparatus when there is no need to distinguish. The information processing system 1 can provide a service that allows a student to learn by imitating modeled motions shown by an instructor. Subjects of learning may include, for example, dance, calligraphy, cooking, or the like. Suppose that the information processing system 1 according to the present embodiment is used to provide dance lessons. Suppose that the first information processing apparatus 10 is used by an instructor showing a dance model. Suppose that the second information processing apparatus 20 is used by a student learning to dance by watching the dance model. Of the users of the information processing system 1, the instructor who uses the first information processing apparatus 10 is also referred to as a first user. The student who uses the second information processing apparatus 20 is also referred to as a second user.

The numbers of first information processing apparatuses 10 and second information processing apparatuses 20 provided in the information processing system 1 are not limited to one each, and may be two or more. The first or second information processing apparatus 10 or 20 may be configured to include a personal computer (PC), such as a notebook PC, a desktop PC, or a tablet PC. The first or second information processing apparatus 10 or 20 may be configured to include a portable terminal, such as a smartphone or tablet, in the possession of the user. The first or second information processing apparatus 10 or 20 is not limited to these examples, and may be configured to include various devices.

The first information processing apparatus 10 and the second information processing apparatus 20 may be wired or wirelessly communicably connected to each other via a network. The first information processing apparatus 10 and the second information processing apparatus 20 may be wired or wirelessly communicably connected to each other without a network.

The first information processing apparatus 10 includes a controller 11, a memory 12, and an interface 13. The second information processing apparatus 20 includes a controller 21, a memory 22, and an interface 23. The controller 11 is also referred to as a first controller. The controller 21 is also referred to as a second controller. The interface 13 is also referred to as a first interface. The interface 23 is also referred to as a second interface.

The controller 11 controls at least one component of the first information processing apparatus 10. The controller 21 controls at least one component of the second information processing apparatus 20. The controllers 11 and 21 may be configured to be identical or similar. The controller 11 or 12 may be configured to include at least one processor. The "processor" is a general purpose processor, a dedicated processor specialized for specific processing, or the like in the present embodiment but not limited to these. The controller 11 or 21 may be configured to include at least one dedicated circuit. The dedicated circuit may include, for example, a field-programmable gate array (FPGA) or an application specific integrated circuit (ASIC). The controller 11 or 12 may be configured with the dedicated circuit instead of the processor, or may be configured with the dedicated circuit along with the processor.

The memory 12 stores any information to be used for operations of the first information processing apparatus 10. The memory 22 stores any information to be used for operations of the second information processing apparatus 20. The memory 12 or 22 may be configured to be identical or similar. The memory 12 or 22 may store a system program, an application program, or the like. The memory 12 or 22 may be configured to include, for example, semiconductor memory, magnetic memory, optical memory, or the like, but not limited to these, may also include various other types of memory. The memory 12 or 22 may function as, for example, a main memory, an auxiliary memory, or a cache memory. The memory 12 or 22 may be configured to include an electromagnetic storage medium, such as a magnetic disk. The memory 12 or 22 may be configured to include a non-transitory computer readable medium. The memory 12 may be included in the controller 11. The memory 22 may be included in the controller 21.

In the first information processing apparatus 10, the interface 13 outputs information, data, or the like from the controller 11, and inputs information, data, or the like to the controller 11. In the second information processing apparatus 20, the interface 23 outputs information, data, or the like from the controller 21, and inputs information, data, or the like to the controller 21. The interface 13 may include a communication module configured to communicably communicate with the interface 23 of the second information processing apparatus 20, either via a network or without a network. The interface 23 may include a communication module configured to communicably communicate with the interface 13 of the first information processing apparatus 10, either via a network or without a network. The communication module may be, for example, compliant with a mobile communication standard, such as the 4th Generation (4G) standard or the 5th Generation (5G) standard. The communication module may be compliant with a communication standard, such as a Local Area Network (LAN). The communication module may be compliant with a wired or wireless communication standard. The communication module is not limited to these examples and may be compliant with various communication standards. The interface 13 or 23 may be configured to be capable of connecting to an external communication module.

The network may be configured to include the Internet, at least one wide area network (WAN), at least one metropolitan area network (MAN), or any combination thereof. The network may be configured to include at least one wireless network, at least one optical network, or any combination thereof. The wireless network may be configured to include, for example, an ad hoc network, a cellular network, a wireless local area network (LAN), a satellite communication network, or a terrestrial microwave network.

The interface 13 or 23 may be configured to be compliant with a standard such as Universal Serial Bus (USB) or Bluetooth® (Bluetooth is a registered trademark in Japan, other countries, or both).

The interface 13 or 23 may be configured with an input device for accepting input of information, data, or the like from the user. The input device may be configured with, for example, a touch panel or touch sensor, or a pointing device such as a mouse. The input device may be configured with a physical key. The input device may be configured with an audio input device, such as a microphone. The interface 13 or 23 may be configured to capable of connecting to an external input device.

The interface 13 or 23 may be configured to include an output device that outputs information, data, or the like to the user. The output device may include, for example, a display device that outputs visual information, such as images, text, or graphics. The display device may be configured to include, for example, a Liquid Crystal Display (LCD), an organic or inorganic Electro-Luminescence (EL) display, a Plasma Display Panel (PDP), or the like. The display device is not limited to these displays, and may be configured to include various other types of displays. The display device may be configured with a light emitting device, such as a Light Emitting Diode (LED) or a Laser Diode (LD). The display device may be configured with various other devices. The output device may include, for example, an audio output device, such as a speaker, that outputs audio information e.g. voice. The output device may include, for example, a vibration device, such as a vibrator, that outputs tactual information e.g. vibration. The output device is not limited to these examples and may include various other devices. The interface 13 or 23 may be configured to be capable of connecting to an external output device. The output device may be configured to be wearable by the first or second user, for example, as a wristband. The output device may be configured as a tool used by the first or second user in practicing motion, such as a brush used in calligraphy, or a knife or cutting board used in cooking.

While not essential, the first information processing apparatus 10 may further include an imager 14. While not essential, the second information processing apparatus 20 may further include an imager 24. The imager 14 or 24 may include an imaging device such as a camera that captures RGB images. The imager 14 or 24 may include a depth sensor that captures depth images, or a distance measuring device such as a stereo camera. The first or second information processing apparatus 10 or 20 may acquire images or distance measuring data (depth data) from an external imaging device or distance measuring device via the interface 13 or 23. The functions of the imaging device or distance measuring device of the imager 14 or 24 may be included in the functions of the interface 13 or 23.

(Example Operations of Information Processing System 1)

In the information processing system 1 according to the present embodiment, the first information processing apparatus 10 images, by the imager 14, a model for dance demonstrated by the first user. The imager 14 may capture the posture of the first user, as a still image. The imager 14 may capture the motion of the first user, as a moving image. The first information processing apparatus 10 outputs the image captured by the imager 14 to the second information processing apparatus 20. The second information processing apparatus 20 displays the image acquired from the first information processing apparatus 10 on the display device of the interface 23, so that the second user can watch and learn from the image acquired from the first information processing apparatus 10.

<Display of Image Captured by First Information Processing Apparatus 10 on Second Information Processing Apparatus 20>

In the information processing system 1, the first information processing apparatus 10 may capture an RGB image and a depth image of the first user, and the second information processing apparatus 20 may display a three-dimensional image of the first user based on the RGB image and the depth image. Specific operations for displaying the three-dimensional image will be described below.

Figure 2:
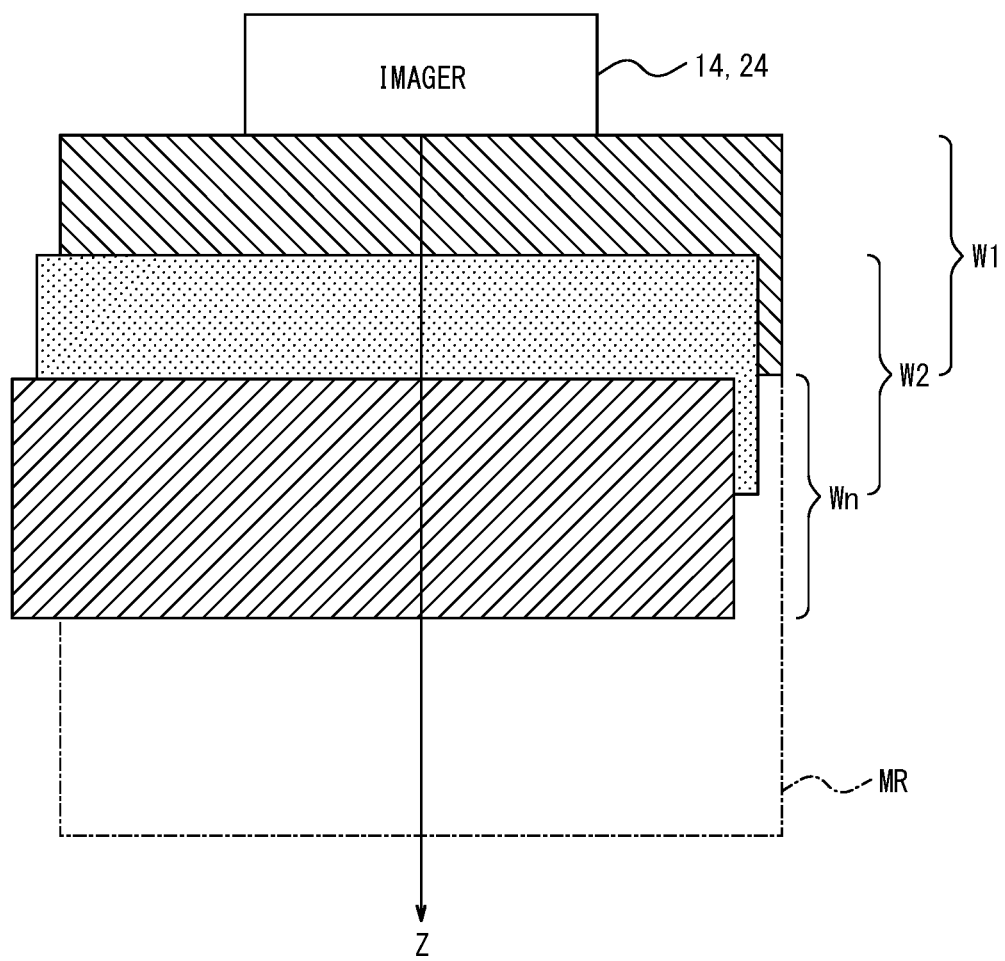
FIG. 2 is a diagram illustrating an example of a plurality of windows included in a depth image.

The imager 14 of the first information processing apparatus 10 captures an RGB image of at least a part of a body of the first user, and measures distances to portions of at least the part of the body of the first user. As illustrated in FIG. 2, the imager 14 measures a distance to each portion included in at least the part of the body of the first user located within a measurement range MR, and generates a depth image of the first user within the measurement range MR. The depth image is assumed to include a plurality of windows W1, . . . , Wn, set within the measurement range MR. The plurality of windows W1, . . . , Wn are aligned in a depth direction Z, which is a direction away from the imager 14. That is, the plurality of windows W1, . . . , Wn are positioned at different depths from each other.

The distance to each portion of the body of the first user corresponds to a depth at which each window is located. Each window included in the depth image represents data on a portion located at a depth corresponding to the window, of the portions of the body of the first user. The depth image represents three-dimensional data on the portions of at least the part of the body of the first user, as a set of data on the portions located at the depths corresponding to the respective windows. The number (n) of the windows is an arbitrary integer greater than or equal to 2, and can be set to a value of 30, for example.

The controller 11 of the first information processing apparatus 10 identifies, from among the plurality of windows W1, . . . , Wn included in the depth image, a window Wj corresponding to the position of a portion of at least the part of the body of the first user. The controller 11 transmits a window identifier identifying the window Wj to the second information processing apparatus 20. Upon receiving the window identifier from the first information processing apparatus 10, the controller 21 of the second information processing apparatus 20 identifies, from among the plurality of windows W1, . . . , Wn, the window Wj corresponding to the received window identifier.

For each pixel in the depth image, the controller 11 of the first information processing apparatus 10 converts a measured distance to a relative distance within the window Wj and transmits the resulting converted value as pixel data to the second information processing apparatus 20. The controller 21 of the second information processing apparatus 20 restores the depth image by receiving the pixel data from the first information processing apparatus 10 and converting the relative distance within the window Wj indicated by the received pixel data into a measured distance for each pixel of the depth image. The controller 21 synthesizes the restored depth image with pixel data of the RGB image, and displays the composite image on the display device of the interface 23.

The depth image may be configured as a set of windows as described above, but not limited to this, may be represented as a single distance map in which a distance to each portion of the body of the first user is assigned to each pixel. The depth image may be generated in various ways.

The RGB image of the first user and the depth image of the first user are assumed to be included in information regarding the first user. The information regarding the first user is also referred to as first user information. The first information processing apparatus 10 outputs the first user information to the second information processing apparatus 20 via the interface 13.

The controller 21 of the second information processing apparatus 20 controls the display device of the interface 23 to display an image of the model for dance demonstrated by the first user, based on the first user information acquired from the first information processing apparatus 10. The display device of the interface 23 may display the image of the model for dance demonstrated by the first user as a three-dimensional composite image of the RGB image and the depth image, or as the RGB image alone. The controller 21 may generate a three-dimensional image based on each pixel of the RGB image and depth information corresponding to each pixel. The controller 21 may generate a polygon of the first user based on the depth image and render the RGB image onto the polygon to generate a three-dimensional image.

The second information processing apparatus 20 images, by the imager 24, a second user practicing a dance by watching the image of the model for dance. The imager 24 may capture the posture of the second user, as a still image. The imager 24 may capture the motion of the second user, as a moving image. The imager 24 also measures distances to portions of at least a part of a body of the second user and generates a depth image of the second user. An RGB image of the second user and the depth image of the second user are assumed to be included in information regarding the second user. The information regarding the second user is also referred to as second user information. The second information processing apparatus 20 outputs the second user information to the first information processing apparatus 10 via the interface 23. The first information processing apparatus 10 may display an image of the second user on the display device of the interface 13.

<Extraction of Difference Between First User Information and Second User Information>

The information processing system 1 extracts the difference between the first user information and the second user information and notifies the first or second user. The extraction of the difference between the first user information and the second user information and the notification of the difference may be performed by the controller 11 of the first information processing apparatus 10 or by the controller 21 of the second information processing apparatus 20. An example operation in which the controller 11 of the first information processing apparatus 10 extracts and notifies the difference between the first user information and the second user information will be described below.

Figure 3A:
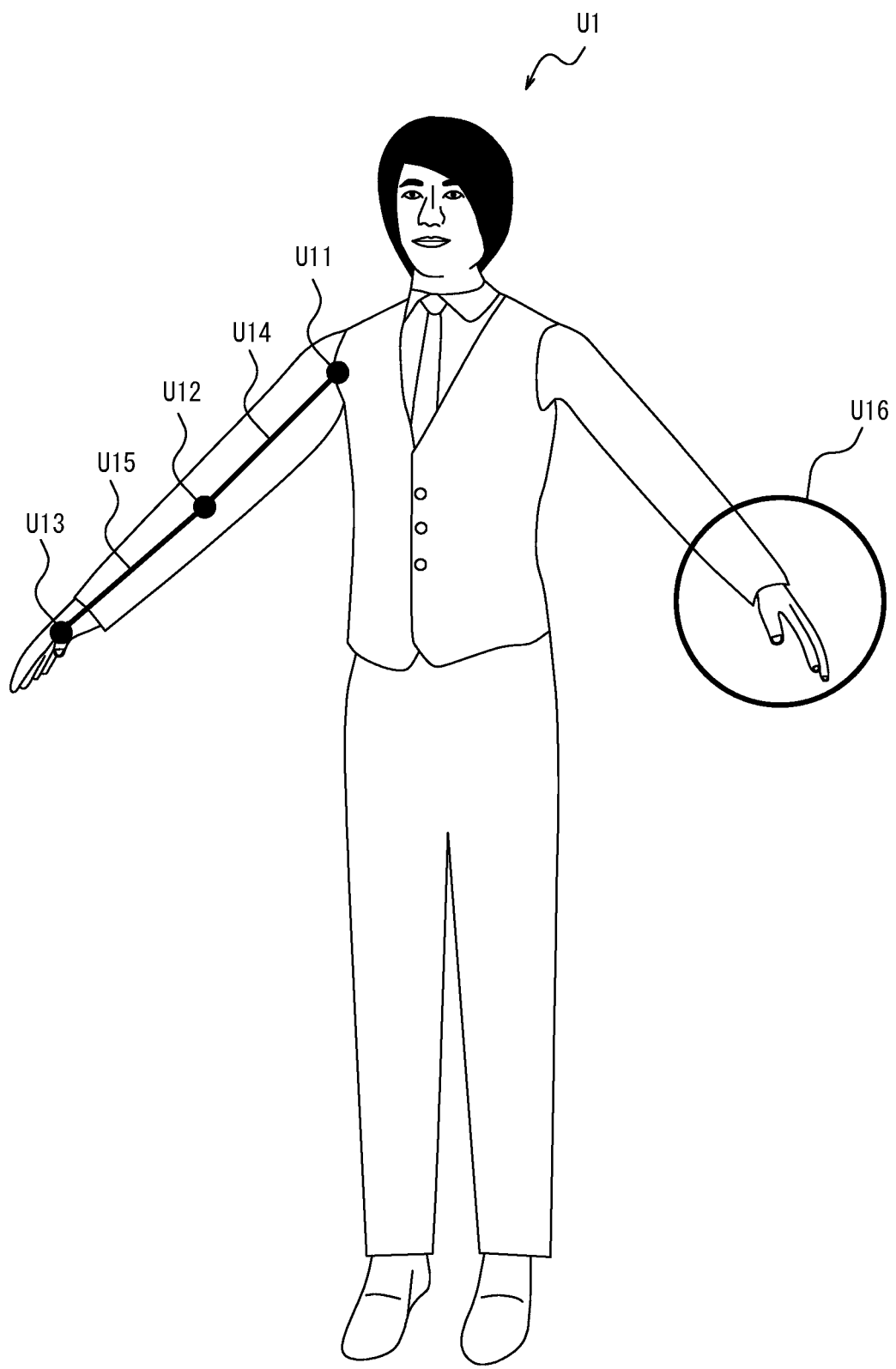
FIG. 3A is a diagram illustrating an example of displaying first user information.

The controller 11 of the first information processing apparatus 10 may analyze the image of the first user captured by the imager 14 and extract skeletal information on the first user. As illustrated in FIG. 3A, the controller 11 may detect, for example, the position of a joint U11 corresponding to a shoulder joint of a right arm of a first user U1, the position of a joint U12 corresponding to an elbow joint, or the position of a joint U13 corresponding to a hand. The controller 11 may detect a bone U14 connecting the joints U11 and U12, or a bone U15 connecting the joints U12 and U13. The first information processing apparatus 10 may output the skeletal information on the first user to the second information processing apparatus 20 via the interface 13. The skeletal information on the first user may be included in the first user information.

Figure 3B:
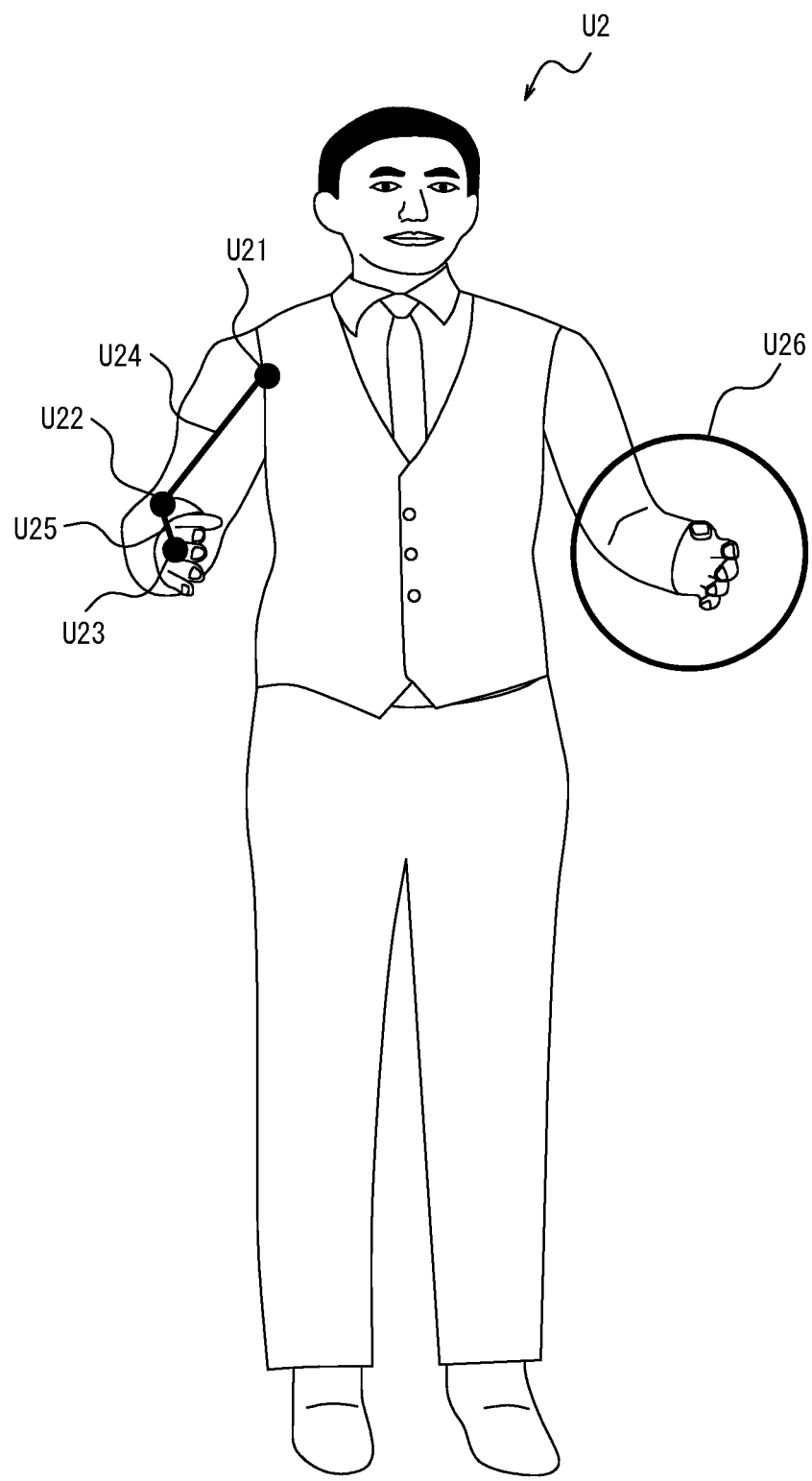
FIG. 3B is a diagram illustrating an example of displaying second user information.

The controller 11 may analyze the image of the second user acquired from the second information processing apparatus 20 and extract skeletal information on the second user. As illustrated in FIG. 3B, the controller 11 may detect, for example, the position of a joint U21 corresponding to a shoulder joint of a right arm of a second user U2, the position of a joint U22 corresponding to an elbow joint, or the position of a joint U23 corresponding to a hand. The controller 11 may detect a bone U24 connecting the joints U21 and U22, or a bone U25 connecting the joints U22 and U23. The controller 21 of the second information processing apparatus 20 may extract the skeletal information on the second user, and output the skeletal information on the second user to the first information processing apparatus 10.

The controller 11 may set, based on the type of motion of the first or second user, skeletal information to be extracted. When the first or second user performs dance motion, the controller 11 may extract skeletal information on the whole body of the first or second user. When the first or second user performs calligraphy or cooking motion, the controller 11 may extract skeletal information on the upper body of the first or second user. The controller 11 may accept, from the first user, at the input device of the first information processing apparatus 10, input specifying a body part from which the skeletal information is to be extracted.

The controller 11 compares the skeletal information on the first user with the skeletal information on the second user to detect a difference in the posture or motion of the second user relative to the model for dance demonstrated by the first user. The controller 11 may detect, for example, the difference between the bone U14 or U15 of the first user U1 in FIG. 3A and the bone U24 or U25 of the second user U2 in FIG. 3B. The controller 11 may calculate, as a value representing the difference, a difference in angle representing the direction of a bone, a difference in coordinates representing the position of a bone, or a distance of deviation of a bone. The controller 11 may represent the position of a bone in three-dimensional coordinates that take the depth direction into account, or may represent the position of a bone in two-dimensional coordinates that ignore the depth direction.

The controller 11 may detect the difference between the position of the joint U11, U12, or U13 of the first user U1 in FIG. 3A and the position of the joint U21, U22, or U23 of the second user U2 in FIG. 3B. The controller 11 may calculate, as a value representing the difference, a difference in coordinates representing the position of a joint or a distance of deviation of a joint. The controller 11 may represent the position of a joint in three-dimensional coordinates that take the depth direction into account, or may represent the position of a joint in two-dimensional coordinates that ignore the depth direction.

The controller 11 may detect the difference by taking into account the difference between the physique of the first user and the physique of the second user. The controller 11 may reduce effects by the difference in physique by comparing an orientation of at least a part of bones between the first and second users, for example. The controller 11 may reduce effects by the difference in physique by comparing balance of a portion of at least a part of a body corresponding to each other between the first and second users, for example.

The controller 11 may calculate a degree of divergence, which is a numerical value representing the magnitude of divergence between the image of the first user and the image of the second user, as the difference between the posture or motion of the first user and the posture or motion of the second user. The degree of divergence is calculated with a larger value, with increase in the difference. The controller 11 may calculate the degree of deviation for a portion of at least a part of the body of the second user. The controller 11 may detect the difference by calculating the degree of divergence in an image of each of the first and second users. The controller 11 may, for example, analyze an image of a tip of a left hand of the first user U1 in FIG. 3A, as an interest point U16 in the posture of the first user. The controller 11 may also analyze an image of a tip of a left hand of the second user U2 in FIG. 3B, as an interest point U26 in the posture of the second user. The controller 11 may calculate, as the difference in posture between the first user and the second user, the degree of divergence in the image, based on the analysis results of the images corresponding to the interest points U16 and U26.

When the images of the first and second users are moving images, the controller 11 may detect the difference by extracting skeletal information on the first and second users in at least a part of frames of the moving images. The controller 11 may detect the difference by analyzing an interest point in posture of each of the first and second users in at least a part of frames of the moving image.

The controller 11 may detect the difference by synchronizing and comparing frames of the moving image of the first user with frames of the moving image of the second user. For example, the controller 11 may detect the difference between the posture of the first user and the posture of the second user in frames corresponding to the same time, as a difference in the motion of the second user relative to the motion of the first user. For example, the controller 11 may compare the posture of the first user in a frame corresponding to a certain time with the posture of the second user in a frame corresponding to a different time. The controller 11 may detect that the timing of the motion of the second user is off relative to the motion of the first user when the posture of the first user in a frame corresponding to a certain time matches the posture of the second user in a frame corresponding to a different time.

The controller 11 may detect the difference between the motion speed of the first user and the motion speed of the second user by comparing each of multiple frames of the moving image of first user with each of multiple frames of the moving image of the second user.

The controller 11 may accept input from the first user to specify which portion of the body of each of the first and second users is to be compared. The portion that is to be compared is also referred to as the portion to be compared. The controller 11 may display the image of the first or second user on the display device of the first information processing apparatus 10, and accept input from the first user to specify a portion to be compared on the input device of the first information processing apparatus 10. The controller 11 may display the skeletal information on the first or second user on the display device of the first information processing apparatus 10, and accept input from the first user to specify a bone or joint, as a portion to be compared, on the input device of the first information processing apparatus 10.

The controller 11 may accept input from the first user to specify balance in the posture or motion to be compared between the first and second users.

The controller 11 may accept input from the first user to specify which frame of the multiple frames included in the moving image of each of the first and second users is to be compared. The frame that is to be compared is also referred to as the frame to be compared. The controller 11 may display the moving image of the first or second user on a frame-by-frame basis on the display device of the first information processing apparatus 10, and accept input from the first user to specify a frame to be compared on the input device of the first information processing apparatus 10.

The controller 11 may accept input from the first user to specify which time period of the moving image of each of the first and second users is to be compared. The time period that is to be compared is also referred to as the time period to be compared. The controller 11 may display the moving image of the first or second user on the display device of the first information processing apparatus 10, and accept input from the first user to specify a start and end of a time period to be compared on the input device of the first information processing apparatus 10. The time period to be compared may include only one frame of the moving image. In other words, the time period to be compared may include a frame to be compared.

The controller 11 may automatically determine a portion to be compared, or a start and end of a time period to be compared based on the image of the first or second user.

As described above, the controller 11 may detect a difference in the posture or motion of the second user, relative to the posture or motion of the first user, based on the image of each of the first and second users. The difference can be calculated for a portion of at least a part of the body of the second user. The difference can be calculated as the amount of positional deviation of a bone or joint. The difference can be calculated as the amount of orientational deviation of a bone. The difference can be calculated as the time difference between the timing of the motions. The difference can be calculated as the difference between the speed of the motions.

<Notification of Difference Information>

The controller 11 of the first information processing apparatus 10 detects a difference in the posture or motion of the second user, relative to the posture or motion of the first user, and outputs information regarding the detected difference to the second information processing apparatus 20. The information regarding the difference is also referred to as difference information.

The controller 21 of the second information processing apparatus 20 notifies the second user of the difference information while controlling the display device of the interface 23 to display the image of the second user. For example, the controller 21 may generate an image in which information indicating a large difference from the posture or motion of the first user is superimposed on the image of the second user, and control the display device to display the image. The controller 21 may superimpose a marker image that highlights an area with the large difference on the image of the second user.

While controlling the display device to display the image of the second user, the controller 21 may notify the second user, by the output device of the interface 23, that the difference between the posture or motion of the second user and the posture or motion of first user has increased at the timing when the difference has increased. In other words, the controller 21 may synchronize the display of the image of the second user on the display device with the notification of the difference information to the second user. As the notification by the output device, the controller 21 may, for example, output audio at the timing when the difference has increased, or output vibration to be given to the second user. The controller 21 may notify the second user of the difference information while controlling the display device to display the image of the first user.

The controller 21 may determine that the difference has increased when a value representing the difference is equal to or greater than a comparison threshold. The comparison threshold can be defined as appropriate. The comparison threshold may be set based on a specification by the first user. The comparison threshold may be set based on the posture or motion of the second user that is pointed by the first user as having a large difference.

By checking the notified difference information, the second user may recognize that the difference between the posture or motion of the first user, which serves as a model for dance, and the posture or motion of the second user himself/herself has increased. The second user can practice to bring his/her own posture or motion closer to the model for dance by recognizing the posture or motion in which the difference between the model for dance and himself/herself has increased. In other words, according to the information processing system 1 of the present embodiment, the practice efficiency of the second user i.e. the student can be improved.

The difference information may be notified to the first user. Specifically, the controller 11 of the first information processing apparatus 10 may notify the first user of the difference information while controlling the display device to display the image of the first user. The controller 11 may notify the first user of the difference information while controlling the display device to display the image of the second user.

<Example Procedure for Information Processing Method>

As described above, in the information processing system 1 according to the present embodiment, the first and second information processing apparatuses 10 and 20 notify the second user, who practices by watching the model of the first user, of the difference information on the posture or motion of the second user. The controller 11 of the first information processing apparatus 10 and the controller 21 of the second information processing apparatus 20 may perform an information processing method including a procedure of the flowchart in FIG. 4, for example. The information processing method may be implemented as an information processing program to be executed by the controllers 11 and 12. The information processing program may be stored on a non-transitory computer readable medium.

The controller 11 of the first information processing apparatus 10 starts acquiring first user information (step S11). The controller 21 of the second information processing apparatus 20 starts acquiring second user information (step S21). The controllers 11 and 21 may synchronize the start of acquisition of the information. Specifically, the controller 11 may notify the controller 21 of the start of acquisition of the information upon starting acquiring the first user information. The controller 21 may start acquiring the second user information in response to the notification from the controller 11.

The controller 11 analyzes the acquired first user information and stores the first user information in the memory 12 (step S12). The controller 21 analyzes the acquired second user information and stores the second user information in the memory 22 (step S22).

The controller 11 ends acquiring the first user information (step S13). The controller 21 ends acquiring the second user information (step S23). The controllers 11 and 21 may synchronize the end of acquisition of the information. Specifically, the controller 11 may notify the controller 21 of the end of acquisition of the information upon ending acquiring the first user information. The controller 21 may end acquiring the second user information in response to the notification from the controller 11.

The controller 21 outputs the second user information to the first information processing apparatus 10 (step S24). The controller 11 acquires the second user information from the second information processing apparatus 20 (step S14). The controller 11 generates difference information based on a comparison between the first and second user information, and outputs the generated difference information to the second information processing apparatus 20 (step S15). The controller 21 acquires the difference information from the first information processing apparatus 10 (step S25).

The controller 21 notifies the second user of the difference information while displaying an image of the second user (step S26). After performing the process of step S26, the controller 21 ends the execution of the procedure in the flowchart of FIG. 4. After performing the process of step S15, the controller 11 ends the execution of the procedure in the flowchart of FIG. 4. After performing the process of step S15, the controller 11 may notify the first user of the difference information while displaying an image of the first user.

SUMMARY

As described above, according to the information processing system 1, first information processing apparatus 10, and second information processing apparatus 20 of the present embodiment, the second user can easily recognize the difference between the modeled posture or motion demonstrated by the first user and the posture or motion of the second user himself/herself. The second user can practice to reduce the difference by recognizing the difference from the model. As a result, the practice efficiency of the second user can be improved.

Other Embodiments

An example configuration of the information processing system 1 will be described below.

<Configuration Including a Plurality of Second Information Processing Apparatuses 20>

Figure 5:
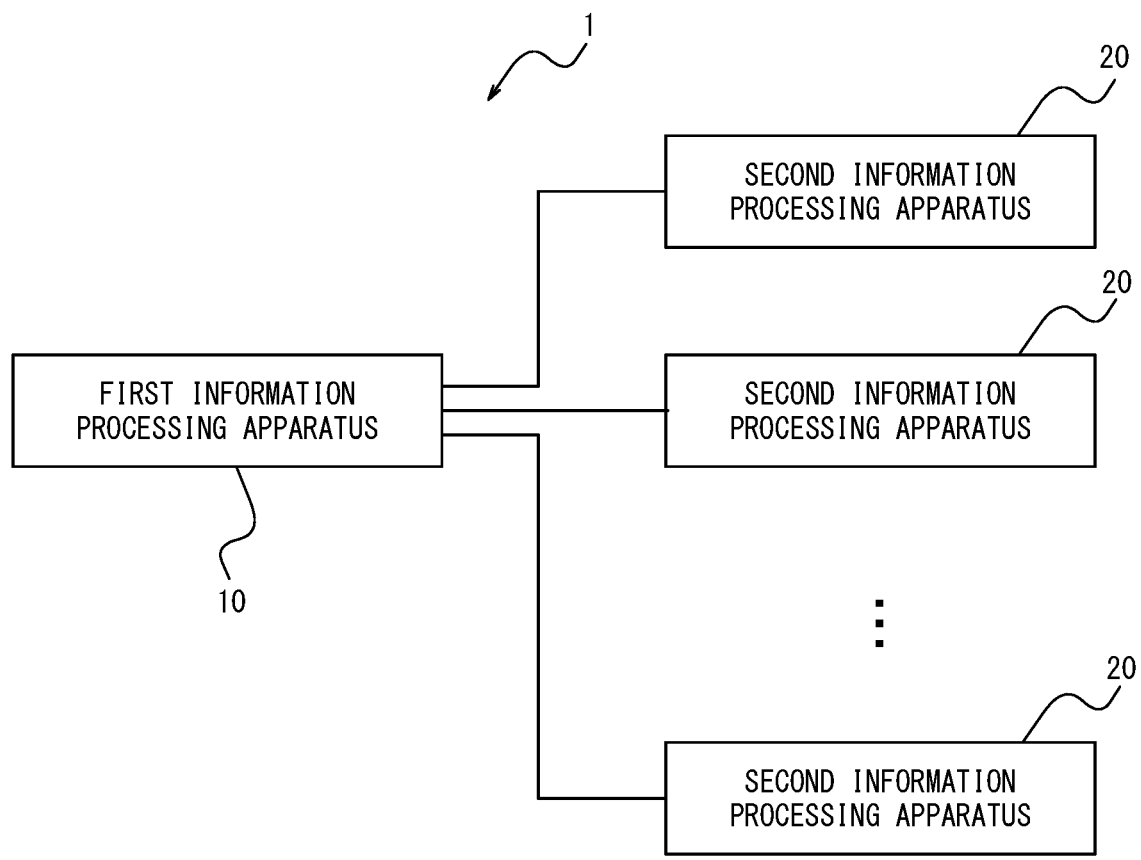
FIG. 5 is a block diagram illustrating an example configuration of the information processing system in which multiple second information processing apparatuses are connected to a single first information processing apparatus.

As illustrated in FIG. 5, the information processing system 1 includes the single information processing apparatus 10 and a plurality of second information processing apparatuses 20. The second information processing apparatuses 20 are each used by a different second user and acquire a different piece of second user information. The first information processing apparatus 10 is communicably connected to each second information processing apparatus 20. The first information processing apparatus 10 and each second information processing apparatus 20 may be wired or wirelessly communicably connected to each other via a network. The first information processing apparatus 10 and each second information processing apparatus 20 may be wired or wirelessly communicably connected to each other without a network.

The controller 11 of the first information processing apparatus 10 acquires first user information by the imager 14 and also acquires different pieces of second user information on the second users who use the second information processing apparatuses 20, respectively. The controller 11 generates difference information between the first user information and each piece of the second user information. In other words, the controller 11 generates the difference information for each different second user.

The controller 11 may classify the second users into multiple groups based on the difference information generated for each second user. For example, the controller 11 may classify second users whose differences in posture or motion, relative to the specific posture or motion of a first user, are the same or similar, as a group that makes a mistake in the specific posture or motion. The controller 11 may classify second users whose differences in posture or motion, relative to the specific posture or motion of a first user, are greater than a predetermined value, as a group that makes a mistake in the specific posture or motion. The predetermined value may be set as a threshold for a difference in the position or orientation of a joint or bone included in skeletal information. The predetermined value may be set as a threshold for the degree of divergence between an image of the first user and an image of the second user.

The controller 11 may classify second users whose differences in posture or motion at specific timing or in a specific time period are the same or similar, as a group that makes a mistake in posture or motion at the specific timing or in the specific time period. The controller 11 may classify second users whose differences in posture or motion at specific timing or in a specific time period are greater than a predetermined value, as a group that makes a mistake in posture or motion at the specific timing or in the specific time period.

A start and end of the specific timing or specific time period may be specified by the first user. The controller 11 may, for example, set the start and end of the specific timing or specific time period based on information entered by the first user on the input device of the interface 13. The controller 11 may, for example, set the timing of a cueing action by the first user, as the start and end of the specific timing or specific time period. The cueing action may include, for example, a specific gesture of the first user or a specific facial expression, such as the first user closing one eye.

The start and end of the specific timing or specific time period may be set according to, for example, the timing of a break in a piece of music used in dance motion, a start and end of the piece of music, or the like. The start and end of the specific timing or specific time period may be set according to, for example, a start and end of each important point or a stroke in a character to be written in calligraphy. The start and end of the specific timing or specific time period may be set according to, for example, a critical point, break, or the like in each task in a cooking process.

The first information processing apparatus 10 may communicate with a plurality of second information processing apparatuses 20 used by a plurality of second users classified in the same group. The second users classified in the same group have the same or similar differences in posture or motion. In other words, the second users classified in the same group make the same or similar mistakes. Therefore, the first user using the first information processing apparatus 10 can communicate with the second information processing apparatuses 20 used by the second users classified in the same group to provide focused instruction on the incorrect posture or motion. As a result, the practice efficiency of the second users can be improved.

The plurality of second information processing apparatuses 20 used by the plurality of second users classified in the same group may communicate with each other. The second users classified in the same group may point out posture or motion errors to each other. As a result, the practice efficiency of the second users can be improved.

The controller 11 may classify the second users into a group that makes a mistake in the specific posture or motion and a group that does not make a mistake in the specific posture or motion. The second information processing apparatuses 20 used by second users classified in the group that makes a mistake in the specific posture or motion may communicate with the second information processing apparatuses 20 used by second users classified in the group that does not make a mistake in the specific posture or motion. In this case, the second users who do not make a mistake in the specific posture or motion can instruct the second users who make a mistake in the specific posture or motion. By allowing the second users to instruct each other, a burden on the first user can be reduced. Also, the second users can practice without waiting for the first user. As a result, the practice efficiency of the second users can be improved.

<Example Configuration Including Third Information Processing Apparatus 30>

The information processing system 1 may be further include a third information processing apparatus 30, as illustrated in FIG. 6. The third information processing apparatus 30 may function as a host server. In this case, the first information processing apparatus 10 may function as a client server (terminal apparatus) used by a first user. The second information processing apparatus 20 may function as a client server (terminal apparatus) used by a second user. The third information processing apparatus 30, as a host server, may acquire first and second user information from the client servers, generate difference information, and output the difference information to each of the client servers of the first and second users.

The information processing system 1 may have one of the first and second information processing apparatuses 10 and 20 function as a host server and the other as a client server.

While an embodiment of the present disclosure has been described with reference to the drawings and examples, it is to be noted that various modifications and revisions may be implemented by those skilled in the art based on the present disclosure. Accordingly, such modifications and revisions are included within the scope of the present disclosure. For example, functions or the like included in each means, each step, or the like can be rearranged without logical inconsistency, and a plurality of means, steps, or the like can be combined into one or divided.

Some of the embodiments of the present disclosure are described below. However, it should be noted that the embodiments of the present disclosure are not limited to these.

APPENDIX 1

An information processing apparatus comprising:
an interface configured to acquire an image of a first user, information regarding posture or motion of the first user, and information regarding posture or motion of a second user; and
a controller configured to generate difference information regarding a difference between the posture or motion of the first user and the posture or motion of the second user,
wherein the controller is configured to notify the second user of the difference information while controlling a display device to display the image of the first user or an image of the second user.

APPENDIX 2

The information processing apparatus according to appendix 1, wherein
the interface is configured to acquire, as the information regarding the posture or motion of the first and second users, skeletal information including bones or joints of the first and second users, and
the controller is configured to generate the difference information based on a comparison between the skeletal information on the first user and the skeletal information on the second user.

APPENDIX 3

The information processing apparatus according to appendix 2, wherein
the interface is configured to acquire information specifying a portion to be compared from among the skeletal information, and the controller is configured to generate the difference information based on the portion to be compared among the skeletal information.

APPENDIX 4

The information processing apparatus according to appendix 3, wherein the interface is configured to acquire, as the information specifying the portion to be compared from among the skeletal information, information specifying a bone or joint included in the skeletal information, or information specifying at least a part of a body of the first user in the image of the first user.

APPENDIX 5

The information processing apparatus according to appendix 3 or 4, wherein
the interface is configured to:
acquire, as the image of the first user, a moving image including a plurality of frames;
acquire, as the skeletal information, information mapping motion of a bone or joint included in the skeletal information to the moving image; and
acquire, as the information specifying the portion to be compared from among the skeletal information, information specifying a frame of the moving image, and
the controller is configured to generate the difference information based on a comparison in the skeletal information corresponding to the specified frame.

APPENDIX 6

The information processing apparatus according to any one of appendices 2 to 5, wherein the controller is configured to generate the difference information based on a comparison in orientation between bones or joints included in the skeletal information.

APPENDIX 7

The information processing apparatus according to any one of appendices 1 to 6, wherein the controller is configured to notify the second user of the difference information by controlling the display device to display an image in which the difference information is superimposed on the image of the second user.

APPENDIX 8

The information processing apparatus according to appendix 7, wherein the controller is configured to synchronize display of the image of the second user on the display device with notification of the difference information to the second user.

APPENDIX 9

The information processing apparatus according to any one of appendices 1 to 8, wherein
the interface is configured to acquire information regarding posture or motion of each of a plurality of second users, and
the controller is configured to:
generate the difference information for each of the plurality of second users; and
classify the plurality of second users into groups based on the difference information for each of the plurality of second users.

APPENDIX 10

The information processing apparatus according to appendix 9, wherein the controller is configured to classify, among the plurality of second users, users whose values representing differences in posture or motion of a portion to be compared are equal to or greater than a comparison threshold into a same group.

APPENDIX 11

The information processing apparatus according to appendix 9 or 10, wherein the controller is configured to classify, among the plurality of second users, users whose values representing differences in posture or motion in a time period to be compared are equal to or greater than a comparison threshold into a same group.

APPENDIX 12

The information processing apparatus according to appendix 11, wherein the interface is configured to acquire information specifying the time period to be compared.

APPENDIX 13

The information processing apparatus according to appendix 11, wherein the controller is configured to set a start or end of the time period to be compared based on the image of the first user.

APPENDIX 14

The information processing apparatus according to any one of appendices 10 to 13, wherein the controller is configured to control a display device of each user to display images of the users classified into the same group, among the plurality of second users, with respect to each other.

APPENDIX 15

The information processing apparatus according to any one of appendices 10 to 14, wherein the controller is configured to control a display device of the first user to display images of the users classified into the same group, among the plurality of second users.

APPENDIX 16

An information processing system comprising the information processing apparatus according to any one of appendices 1 to 15, as each of a first information processing apparatus and a second information processing apparatus, wherein
the first information processing apparatus comprises:
a first interface configured to acquire information regarding posture or motion of a first user, and information regarding posture or motion of a second user; and
a first controller configured to generate difference information regarding a difference between the posture or motion of the first user and the posture or motion of the second user, and output the difference information to the second information processing apparatus, and the second information processing apparatus comprises a second interface configured to:
acquire an image of the first user and the difference information; and
notify the second user of the difference information while displaying the image of the first user.

APPENDIX 17

An information processing method comprising:
acquiring an image of a first user, information regarding posture or motion of the first user, and information regarding posture or motion of a second user;
generating difference information regarding a difference between the posture or motion of the first user and the posture or motion of the second user;
controlling a display device to display the image of the first user or an image of the second user; and
notifying the second user of the difference information.

APPENDIX 18

A non-transitory computer readable medium storing an information processing program configured to cause an information processing apparatus to execute operations, the operations comprising:
acquiring an image of a first user, information regarding posture or motion of the first user, and information regarding posture or motion of a second user;
generating difference information regarding a difference between the posture or motion of the first user and the posture or motion of the second user;
controlling a display device to display the image of the first user or an image of the second user; and
notifying the second user of the difference information.

The invention claimed is:

1. An information processing apparatus comprising:
an interface configured to acquire an image of a first user, information regarding posture or motion of the first user, and information regarding posture or motion of a second user; and
a controller configured to generate difference information regarding a difference between the posture or motion of the first user and the posture or motion of the second user, wherein:
the controller is configured to notify the second user of the difference information while controlling a display device to display the image of the first user or an image of the second user,
the interface is configured to acquire, as the information regarding the posture or motion of the first and second users, skeletal information including bones or joints of the first and second users,
the controller is configured to generate the difference information based on a comparison between the skeletal information on the first user and the skeletal information on the second user,
the interface is configured to acquire information specifying a portion to be compared from among the skeletal information, and
the controller is configured to generate the difference information based on the portion to be compared among the skeletal information.

2. The information processing apparatus according to claim 1, wherein the interface is configured to acquire, as the information specifying the portion to be compared from among the skeletal information, information specifying a bone or joint included in the skeletal information, or information specifying at least a part of a body of the first user in the image of the first user.

3. The information processing apparatus according to claim 1, wherein
the interface is configured to:
acquire, as the image of the first user, a moving image including a plurality of frames;
acquire, as the skeletal information, information mapping motion of a bone or joint included in the skeletal information to the moving image; and
acquire, as the information specifying the portion to be compared from among the skeletal information, information specifying a frame of the moving image, and
the controller is configured to generate the difference information based on a comparison in the skeletal information corresponding to the specified frame.

4. The information processing apparatus according to claim 1, wherein the controller is configured to generate the difference information based on a comparison in orientation between bones or joints included in the skeletal information.

5. The information processing apparatus according to claim 1, wherein the controller is configured to notify the second user of the difference information by controlling the display device to display an image in which the difference information is superimposed on the image of the second user.

6. The information processing apparatus according to claim 5, wherein the controller is configured to synchronize display of the image of the second user on the display device with notification of the difference information to the second user.

7. The information processing apparatus according to claim 1, wherein
the interface is configured to acquire information regarding posture or motion of each of a plurality of second users, and
the controller is configured to:
generate the difference information for each of the plurality of second users; and
classify the plurality of second users into groups based on the difference information for each of the plurality of second users.

8. The information processing apparatus according to claim 7, wherein the controller is configured to classify, among the plurality of second users, users whose values representing differences in posture or motion of a portion to be compared are equal to or greater than a comparison threshold into a same group.

9. The information processing apparatus according to claim 7, wherein the controller is configured to classify, among the plurality of second users, users whose values representing differences in posture or motion in a time period to be compared are equal to or greater than a comparison threshold into a same group.

10. The information processing apparatus according to claim 9, wherein the interface is configured to acquire information specifying the time period to be compared.

11. The information processing apparatus according to claim 9, wherein the controller is configured to set a start or end of the time period to be compared based on the image of the first user.

12. The information processing apparatus according to claim 8, wherein the controller is configured to control a display device of each user to display images of the users classified into the same group, among the plurality of second users, with respect to each other.

13. The information processing apparatus according to claim 8, wherein the controller is configured to control a display device of the first user to display images of the users classified into the same group, among the plurality of second users.

14. An information processing system comprising the information processing apparatus according to claim 1, as each of a first information processing apparatus and a second information processing apparatus, wherein the first information processing apparatus comprises:

- a first interface configured to acquire information regarding posture or motion of a first user, and information regarding posture or motion of a second user; and
- a first controller configured to generate difference information regarding a difference between the posture or motion of the first user and the posture or motion of the second user, and output the difference information to the second information processing apparatus, and the second information processing apparatus comprises a second interface configured to:

acquire an image of the first user and the difference information; and notify the second user of the difference information while displaying the image of the first user.

15. An information processing method comprising:

acquiring an image of a first user, information regarding posture or motion of the first user, and information regarding posture or motion of a second user;

acquiring, as the information regarding the posture or motion of the first and second users, skeletal information including bones or joints of the first and second users;

acquiring information specifying a portion to be compared from among the skeletal information;

generating difference information regarding a difference between the posture or motion of the first user and the posture or motion of the second user based on a comparison between the skeletal information on the first user and the skeletal information on the second user and based on the portion to be compared among the skeletal information;

controlling a display device to display the image of the first user or an image of the second user; and notifying the second user of the difference information.

16. A non-transitory computer readable medium storing an information processing program configured to cause an information processing apparatus to execute operations, the operations comprising:

acquiring an image of a first user, information regarding posture or motion of the first user, and information regarding posture or motion of a second user;

acquiring, as the information regarding the posture or motion of the first and second users, skeletal information including bones or joints of the first and second users;

acquiring information specifying a portion to be compared from among the skeletal information;

generating difference information regarding a difference between the posture or motion of the first user and the posture or motion of the second user based on a comparison between the skeletal information on the first user and the skeletal information on the second user and based on the portion to be compared among the skeletal information;

controlling a display device to display the image of the first user or an image of the second user; and notifying the second user of the difference information.

* * * * *